United States Patent [19]
Köhler

[11] Patent Number: 5,360,169
[45] Date of Patent: Nov. 1, 1994

[54] PROCESS AND APPARATUS FOR THE DISPOSAL OF ARTICLES CONTAINING METALS OR METAL VAPORS

[75] Inventor: Antonius Köhler, Gummersbach, Germany

[73] Assignee: Ubib Unternehmensberatungs GmbH, Illerrieden, Germany

[21] Appl. No.: 952,871

[22] PCT Filed: Jan. 29, 1992

[86] PCT No.: PCT/DE92/00055
§ 371 Date: Nov. 19, 1992
§ 102(e) Date: Nov. 19, 1992

[87] PCT Pub. No.: WO92/13976
PCT Pub. Date: Aug. 20, 1992

[30] Foreign Application Priority Data
Feb. 1, 1991 [DE] Germany .................. 4102972

[51] Int. Cl.$^5$ ............ C22B 43/00; C22B 9/02; H01J 9/00; B09B 3/00
[52] U.S. Cl. ............ 241/24; 241/30; 241/99; 241/DIG. 38; 210/705
[58] Field of Search ............ 241/30, 99, DIG. 38, 241/24; 210/705, 712

[56] References Cited

U.S. PATENT DOCUMENTS 4,858,833  8/1989  Hamulik ............ 241/99 X

FOREIGN PATENT DOCUMENTS 0298035  1/1989  European Pat. Off. .
3412767  10/1985  Germany .
3909380  9/1990  Germany .
3917412  12/1990  Germany .
2089335  6/1982  United Kingdom .

Primary Examiner—Douglas D. Watts
Attorney, Agent, or Firm—Herbert Dubno

[57] ABSTRACT

Described are a process and device for recycling articles containing metals or metal vapors, in particular mercury-vapor lamps. The articles are fed into a container containing a liquid which converts the metal or metal vapor into harmless compounds, in particular sulphides. In the container, the articles are pushed into the liquid and then destroyed under the liquid, releasing the metal or metal vapor, the liquid acting as a protective layer and ensuring that the metal or metal vapor is trapped immediately is released. The container is emptied at intervals diately it is released. The container is emptied at intervals and the contents transferred to a central processing plant.

31 Claims, 4 Drawing Sheets

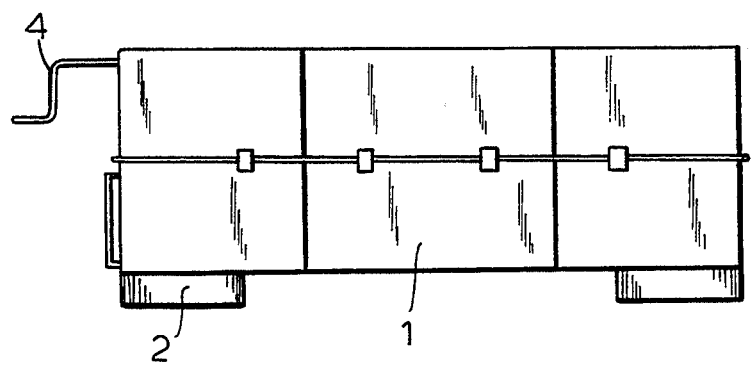 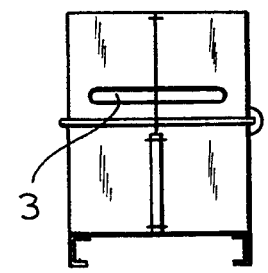
FIG.1a FIG 1b
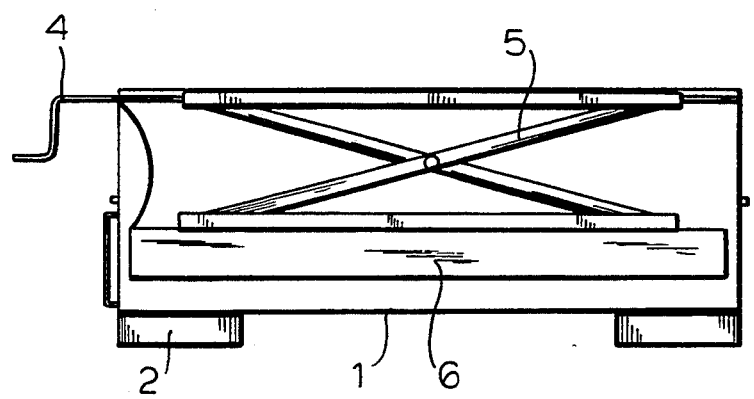 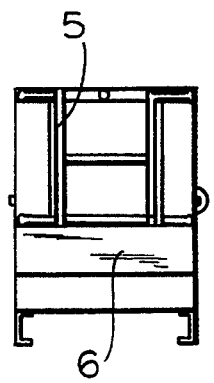
FIG.2a FIG.2b

PROCESS AND APPARATUS FOR THE DISPOSAL OF ARTICLES CONTAINING METALS OR METAL VAPORS

CROSS REFERENCE TO RELATED APPLICATIONS

This application is a national phase of PCT/DE92/00055 filed 29 Jan. 1992 and based, in turn, upon German National Application P41 02 972.0 filed 1 Feb. 1991 under the International Convention.

The present invention is directed to a process for the disposal of articles containing metals or metal vapors, especially lamps containing mercury vapor. Furthermore, the invention is directed to an apparatus carrying out such a process.

BACKGROUND OF THE INVENTION

The articles in question are primarily so-called discharge lamps which, in contrast to filament lamps and halogen lamps, need metal vapors, for example mercury vapor, for the generation of light. For general illumination purposes the following discharge lamps are used: fluorescent lamps including compact fluorescent lamps, mercury vapor high pressure lamps, metal halogen vapor lamps, sodium vapor high pressure lamps. According to the laws of the Federal Republic of Germany such discharge lamps are extraordinary waste and require special disposal. In the past extensive measures had been necessary for carrying out such a special disposal. Furthermore, such articles include for example thermometers, and electrical switches. The invention is directed to the disposal of any articles which contain metals or metal vapors which are detrimental with respect to the environment.

OBJECT OF THE INVENTION

It is an object of the invention to provide a process and a device with which articles containing metals or metal vapors can be disposed of at any site with simple means without damaging mankind and environment.

SUMMARY OF THE INVENTION

According to the invention this object is achieved by a process according to which the articles are introduced into a container which contains a liquid converting the metal or the metal vapor into harmless compounds, especially sulphides, the articles are pressed into the liquid so that a sufficient amount of liquid is thereabove, the articles are crushed within the liquid so that the metal or the metal vapor is released, and the container is emptied and the contents thereof are separated in a central plant.

I can thus provide a plurality of collecting points at which the above-mentioned containers are installed so that the articles or lamps which have to be discarded can be disposed of by the user himself without long distance travel. It is of importance that the articles introduced into the container are destroyed within a liquid which, on the one hand, forms a protective bed with regard to the metals or metal vapors released during destruction and which, on the other hand itself converts these metals or metal vapors into harmless compounds. The metals or metal vapors are substantially immediately immobilized by the liquid so that there is no danger for mankind and the environment. Furthermore, the liquid forms a corresponding implosion protection.

So, for example, the released metals or metal vapors are converted by the liquid in the container into harmless metal sulphides which settle in the container in addition to the glass and metal parts of the lamps. In any case, the liquid in the container ensures that no metals or metal vapors can escape into the atmosphere. A sufficient liquid column is always above the comminuted glass, plastics and/or metal parts of the destroyed articles, too, so that even these parts which are correspondingly contaminated do not contact the atmosphere. Accordingly, it is ensured that the destroyed articles or lamps in the container are stored without damaging mankind and environment.

Furthermore, the inventive process provides that the containers are emptied in certain intervals. This can be done, for example, by means of special vehicles which suck off the contents of the container and transfer the same into a vehicle tank, or by means of vehicles loading the container and transfering the same to a central disposal plant. In this plant a separation of the contents of the corresponding container takes place, wherein the used liquid is purified and recycled and the contaminated metal, plastics and/or glass parts are purified, separated and brought to a further use. The slurry generated by the conversion of the metals or metal vapors is separated, filtered and also brought to a further use.

According to an alternative the inventive process includes the feature that every article, after its introduction into the container, is pressed into the liquid and is crushed therein. However, advantageously it is started with the pushing step down into the liquid not before having introduced a plurality of articles into the container. So, for example, after the introduction of a layer of articles, the layer is pushed into the liquid and thereafter broken up in the liquid.

Of course, the articles or lamps fall directly into the liquid during the introduction into the container. By pushing the articles into the liquid it is ensured that the same are covered by a sufficient liquid column in any case during the following destroying step. This is especially important since particularly the lamps implode when they are destroyed so that otherwise the danger of throwing out of lamp parts or of the metals and metal vapors from the liquid would exist.

As additional measures for avoiding such throwing out, according to an improvement of the invention, the articles are crushed within the liquid after installation of a barrier thereupon. This barrier ensures that no parts or vapors are moved upwardly by the implosions.

As already mentioned, the used liquid serves on the one hand as a protective shell during the destroying of the articles and on the other hand for the conversion of the metal or metal vapors into harmless components. Preferably, a liquid is used which immobilizes the released metal or the released metal vapor substantially immediately, for example converts the same into nontoxic metal sulphides which are deposited the bottom of the container as slurry.

With the inventive process sodium vapor lamps can also be disposed of. When destroying these lamps in the container a short inflammation, caused by the released sodium vapors, is allowed or additives are provided in the liquid which prevent such an inflammation.

When a certain number of lamps has been introduced into the container, its contents is emptied into a container of the central processing plant, either by means of a suction vehicle or by means of direct transport of the container. In this container, optionally under stirring, the liquid, the slurry received by the conversion of the metals or metal vapors and the glass, plastics and/or metal parts of the articles are separated, and these components are discharged separately. Preferably, after the discharge of the liquid the remaining contents of the container is subjected to one or a plurality of rinsing steps. Practically, in one step an acidic medium serves as rinsing liquid which is provided with a biological tenside. In a second step it is rinsed with water. These rinsing steps have the object to remove residual portions of conversion liquid and slurry from the container.

The residual slurry received by the conversion of the metal vapors is separated from the liquid discharged from the container, the rinsing agent and the water. From the residual slurry liquid, rinsing agent and water are recovered by filtration and are recycled into the process, while the filtered slurry is disposed of. The recovered liquid can be used again for filling up the emptied container or for filling new containers. The rinsing agent and water are used for further rinsing steps.

After rinsing the glass, plastics and/or metal parts separated from the slurry and discharged from the container are practically separated from one another in a final step.

The invention also includes an apparatus for carrying out the above-described process. This apparatus includes a container containing a liquid converting the metal or the metal vapors into harmless compounds, especially sulphides, the container including an introduction opening for the articles containing the metals or metal vapors and a breaker means located in the container for crushing the articles.

The container consists of a material which is resistant with respect to the liquid in the container, preferably stainless steel. The container is closed apart from an introduction opening which, for example, is sealed with a rubber packing. For discharging the container has an openable discharge opening or an openable lid.

It is important that the breaker means crushes the articles within the liquid so that the corresponding liquid shell immediately immobilizes the released metals or metal vapors. As breaker means usual usual breakers can be used dependent on the kind of the articles which have to be crushed. In one embodiment of the invention the breaker means has two breaker rollers forming a roller gap therebetween and rotating oppositely. However, the breaker means can also have one breaker roller movable forwardly and backwardly within the container above the bottom of the same. In the first mentioned embodiment the breaking process takes place between the two rollers while it takes place between roller and bottom in the last mentioned embodiment.

According to an especially preferred embodiment the breaker means has a plate movable upwardly and downwardly in the container for pushing the articles into the liquid and for crushing the same in the liquid. Here, the breaking member (plate) has two functions, namely pushing the articles into the liquid and crushing the articles within the liquid.

In its normal condition the plate is in a position above the introduction opening. After the introduction of one or a plurality of articles into the container the plate is driven and is moved downwardly into the liquid in the container. The introduced article or the introduced articles are pushed into the liquid and are finally pressed against the bottom of the container so that they are crushed. The liquid column thereabove forms a protective shell with regard to the escape of metals or metal vapors. The plate functions also as blocking member so that contaminated glass, plastics and/or metals parts and the metals/metal vapors cannot move upwardly.

Practically, the plate covers nearly the whole inner surface of the container and is formed as apertured plate. According to this embodiment the liquid can only flow upwardly through the apertures of the aperture plate during lowering of the plate. By this, an especially safe blocking is obtained, wherein the liquid movements caused by the implosions are strongly damped. Of course, the apertures of the apertured plate are dimensioned so small that the metal, plastics and/or glass parts generated by the destruction of the articles will not be thrown upwardly through the apertures.

In order to obtain an immediate destruction of the articles the plates on their lower side and the container on the inner surface of its bottom wall have preferably projecting portions which form break edges for the articles.

In order to prevent that articles are introduced into the container while the plate is in its lowered condition, the plate has a means closing the inlet opening in its lowered condition. This can be, for example, a suitable closing plate. During the upward movement of the plate this closing plate gradually releases the introduction opening so that articles can be introduced into the container again in the upper end position of the plate.

On principle, the upward and downward movement of the plate can be carried out manually or in a powered manner. The simple manual embodiment has a suitable crank drive means which can cooperate with a scissor type mechanism for moving the plate upwardly and downwardly. Not only with this embodiment but also with motor-driven embodiments suitable control means (limit switches) can be provided which stop the respective movements of the plate at the desired end points. Such means are known to the expert in the art and are not described in detail at this point.

A special embodiment of the invention is characterized by the feature that the plate which is movable upwardly and downwardly in the container is hydraulically or pneumatically movable upwardly and downwardly. For this, a suitable hydraulic or pneumatic apparatus with corresponding control means is provided. As already mentioned, preferably suitable limit switches are provided which stop the respective movements of the plate at the desired end points.

Practically, the plate working with the hydraulic or pneumatic drive has located on the lid of the container a hydraulic or pneumatic cylinder the piston rod thereof being connected to the upper side of the plate. The corresponding cylinder is preferably a double acting cylinder so that the plate is moved upwardly or downwardly in the container dependent on the direction of application of the associated piston. The connection between the piston rod and the plate is preferably a hinged connection so that no loads are transferred onto the piston rod if the plate is tilted.

Preferably, the plate itself has at least one recess which sealingly engages a guide rail located at the inner side of the container. Practically, four guide rails are provided of which two are located on one side of the container, respectively. The guide rails ensure a uniform upward and downward movement of the plate in the container without the occurrence of tiltings of the plate. Furthermore, a uniform application of pressure is ensured with the piston rod centrally engaging the plate since the plate has no yielding possibilities in its edge portions. The engagement between the guide rail and the plate is realized in a sealed manner, wherein suitable resilient sealings are provided which prevent a penetration of the liquid.

According to an especially preferred embodiment of the invention the lid of the container together with the hydraulic or pneumatic cylinder and the plate is swingable away from the container. Of course, the lid closes the container in a sealed manner so that no liquid and no gases can escape. In the uppermost position of the plate the same is located within the lid and outside of the guide rails of the container and can be tilted away together with the lid. The opening or swinging of the lid is supported by suitably installed gas pressure springs, preferably by two gas pressure springs, which are installed at the two container ends. During closing of the lid suitable closing means provide for a sealed closure.

In particular, the container is movable, wherein respective wheels are provided which can be preferably turned upwardly if the container is to be located in a stationary manner. Then, the container is supported by corresponding stands. The container has on its lower side an opening for discharging and filling the liquid. The glass fragments and metal parts are preferably sucked off by a hose which is introduced into the container from above.

Furthermore, the inventive means comprises a central processing plant for the separation of the contents of the container. This central processing plant is supplied with the contents of a plurality of areally installed containers. This can be carried out by means of the already mentioned special vehicles.

The central processing plant has the function of separating the contents of the container which consists substantially of the used liquid, slurry generated by the conversion of the metal or metal vapors and the metal, plastics and/or glass parts of the lamps, to clean the several components and to bring the same in a re-usable condition or a condition for ultimate waste disposal. For this the central processing plant has practically a main processing container and a settling container for the used liquid. The contents of the containers is emptied into the main processing container, and there the liquid is removed into the settling container provided herefor. After the discharge of the liquid one or a plurality of rinsing steps of the residual contents of the container are carried out in the main processing container. Preferably, the central processing plant has another settling container for a rinsing agent and water, respectively, which are used in the corresponding rinsing steps. Practically, a separation means for glass, plastics and/or metal parts on the one side and for the slurry generated by the conversion of the metal vapors on the other side is provided in the main processing container. Finally, the plant has screening means for the separation of glass, plastics and/or metal parts.

Suitable conveying means and pump means as well as filtration means are provided and are not described here in detail.

BRIEF DESCRIPTION OF THE DRAWING

The above and other objects, features, and advantages will become more readily apparent from the following description, reference being made to the accompanying drawing in which:

FIG. 1a is a side view and FIG. 1b is a front view of a container for the receipt of lamps which are to be disposed;

FIG. 2a is a longitudinal section and FIG. 2b is a cross-section through the container shown in FIGS. 1a and 1b;

FIG. 3 is a flow diagram of a central processing plant associated with the containers of FIGS. 1a and 2a;

SPECIFIC DESCRIPTION

Figure 3:
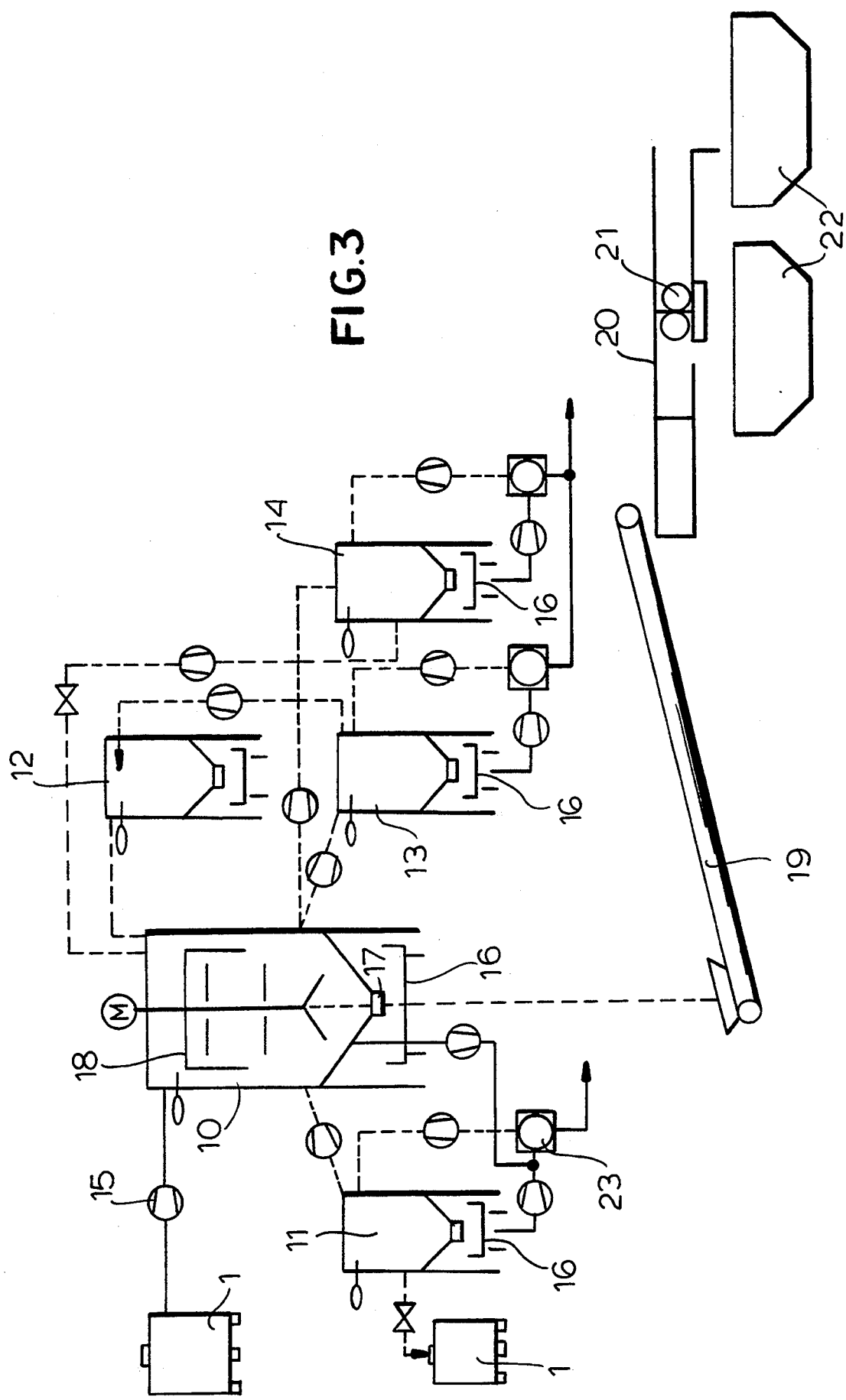

FIGS. 1a, 1b, 2a and 2b show a container 1 serving for the waste disposal of metal vapor-containing lamps. The container 1 is formed in a box-like manner and consists of sheet metal made from stainless steel. An introduction opening 3 for the discharge lamps is located at one front side. As this is known, these lamps are formed in a tube-like manner and have, for example, a diameter of 22 mm. A rubber packing is located at the inner side of the introduction opening 3. When introducing a lamp the rubber packing can be pushed aside. Otherwise, the rubber packing sealingly engages the front wall of the container so that the interior of the container does not have any contact with the atmosphere.

The container is supported by suitable support members 2, for example U-carriers.

Furthermore, a discharge opening (not shown) is provided at the container by means of which the contents of the container can be emptied by the introduction of a suction tube. This discharge opening is normally closed.

FIG. 1a shows the container in a side view while FIG. 1b shows the container in a front view. A crank 4 is located in the upper portion of the front wall of the container. A plate 6 located within the container can be moved up and down by this crank.

FIG. 2a shows a longitudinal section of the container while FIG. 2b shows a corresponding cross-section. As shown, the plate 6 is moved by means of a suitable scissor type mechanism 5 which is actuated by the manually operated crank 4. In the condition shown in FIGS. 2a and 2b the plate 6 is nearly in its lower end position in which it crushes the lamps introduced into the container. In this condition the plate is immersed into the liquid in the container. The plate is formed as apertured plate (not shown) so that the liquid can move upwardly through the apertures provided in the plate. After crushing of the lamps between the plate 6 and the bottom of the container the plate is again moved upwardly into its start position by actuation of the manually actuated crank 4. In this position the introduction opening 3 is again released. This opening was covered by additional means (not shown) during the downward movement of the plate in order to prevent the introduction of lamps in this phase.

Furthermore, the plate on its lower side and the bottom of the container on its upper side are provided with projections and depressions (not shown) in order to promote the destruction of the lamps.

The above-described apparatus operates in the following manner:

The user who wishes to dispose a defect discharge lamp brings the same to the container and introduces the lamp into the container through the introduction opening 3 which is protected by the rubber packing or collar. The plate 6 is in its upper normal position above the introduction opening 3. The lamp falls onto the liquid in the container the level of which being suitably spaced from the introduction opening 3 below the same. After the introduction of a certain number of lamps into the container the plate 6 is moved downwardly by actuation of the manually actuated crank 4, wherein the plate pushes the lamps into the liquid and finally crushes the same in cooperation with the bottom of the container within the liquid. During the downward movement of the plate 6 an appropriate means closes the introduction opening. While the plate moves downwardly within the liquid the same ascends through the apertures in the plate so that the plate substantially covering the whole inner surface of the container can be moved downwardly without difficulties. During the crushing of the lamps the same implode. However, on the one side the liquid and on the other side the plate form an appropriate protective shell. The metals and/or metal vapors released by the implosion are immediately immobilized by the liquid and are converted into harmless compounds, for example mercury sulphides. These compounds are deposited as slurry in the lower portion of the container. Furthermore, the metal and glass parts of the lamps are deposited on the bottom of the container.

Thereafter, the plate 6 is again moved upwardly into its start position by the operation of the manually actuated crank 4. Now, lamps can be introduced into the container again.

In certain intervals the container is emptied by introducing a suction tube through the discharge opening. Then, the container contents is emptied into the tank of a special vehicle by means of a vacuum pump. The special vehicle transports the contents to a central processing plant. The schematic construction of this processing plant is shown in FIG. 3.

The special vehicle empties the contents of the container 1 by means of a corresponding pump 15 into a main processing container 10 which is provided with stirring means 19. After having emptied a corresponding number of container contents into the main processing container 10 it is started with the corresponding processing process. The contents of the container 10 is stirred sufficiently. After a corresponding standing time the liquid is drawn off by means of a pump and is transferred into a settling container 10. From this settling container the sulphide slurry settled at the bottom is drawn off into a collecting tank 16, while the liquid in the upper portion of the container is drawn off and is again used for the filling of containers 1. The sulphide slurry in the collecting tank 16 is filtered in a filter press 23 and is brought to further uses or to an ultimate disposal. The liquid filtered in the filter press 23 is recycled into the settling container 11.

Of course, the discharge of the liquid from the main processing container 10 is observed by means of appropriate liquid level displays.

After the discharge of the liquid a rinsing liquid is added to the main processing container from a rinsing liquid container 12. This rinsing liquid is an acidic medium provided with a biological cleaning agent and having a pH of about 6. The rinsing liquid serves for rinsing the residual content of the container 10. It is drawn off from the main processing container into a settling container 13 for the rinsing liquid from which the corresponding sulphide slurry is drawn off into a collecting tank 16. The slurry is worked up correspondingly by means of a filter press, wherein the residual liquid is fed back into the settling container 13. An extractor for the rinsing liquid is located at the upper end of the settling container 13. The rinsing liquid is fed back into the rinsing liquid container 12.

After the removal of the rinsing liquid from the main processing container 10 in a second step it is rinsed with water which is supplied from an appropriate source. The contaminated water is then drawn off from the main processing container 10 and transferred into a collecting and settling tank 14. The slurry is drawn off from the same and is collected in a collecting tank 16. The slurry is worked up correspondingly by means of a filter press, wherein the residual liquid is fed back into the container 14.

In the lower portion of the main processing container 10 a screening means is located by means of which the metal and glass parts of the lamps are separated from the sulphide slurry collected in the lower part of the container 10. The sulphide slurry enters into a collecting tank 16 below the container 10 and is united from there with the slurry coming from the settling container 11 and is fed to the filter press 23. The metal and glass parts are fed through a container outlet 17 to a conveying means 19 and are conveyed by the same to a separation vibrator which separates the glass and metal parts. Optionally, the parts are still fed through a press 21 in order to still separate adhering metal and glass parts. Finally, the separated parts are conveyed into a suitable collecting tank 22.

Lamps containing metals or metal vapors and the conversion of these metals or metal vapors have been mentioned. Indeed, in the discharge lamps the metal is present not only in a gaseous condition but also in finest elementery distribution. Accordingly, the liquid used according to the invention forms a corresponding protective shell not only for the metal vapors but also for the elementery metals and converts both species into non-toxic substances.

Mercury is the component which is most relevant with regard to the environment.

After the separation of the sulphidic precipitate in the central processing plant by multiple rinsing (washing), optionally with the use of tensides, and after removal of the metallic parts of the discharge lamps a concentrate is present which consists exclusively of glass particles.

According to the results of tests, when mercury is present in the gaseous phase or in finest droplets, the reaction $Hg° \rightarrow HgS$ takes place spontaneously, i.e. immediately at the destruction of the tubes in a corresponding liquid bath. By this the generation of gaseous emissions is prevented.

For the determination of the residual of mercury in the glass particles after the processing and subsequent washing glass particle samples (500 g each) of fluorescent lamps from three test runs were separately tested with respect to mercury. The determination was carried out after ten minutes boiling of the samples in aqua regia with the "mercury atomic absorption spectroscope Hg 254" of the firm Seefelder Meβtechnik on the basis of the so-called "cold vapor technique".

The results of the tests were the following:

| sample number | Hg concentration | |
|---|---|---|
| | mg/kg | % |
| glass particles GB 1 | 1.22 | 0.00012 |
| glass particles GB 2 | 1.07 | 0.00011 |
| glass particles GB 3 | 1.24 | 0.00012 |
| fluorescent lamps intact | 100 | 0.01 |

The results show that only trace amounts of mercury occur in the glass particles which only inessentially exceed the upper concentration range of anthropogenic unloaded clayey sediment stones and soils.

If one uses for a comparison the soil limit value of the sewage sludge regulation (AbfKlärV) of 2 mg/kg which corresponds to the B-value of the so-called "Dutch list", the residual concentrations in the glass particles are below the limit or guide value of the two regulations and are to be classified as not risky.

Starting with a mean Hg concentration of 100 mg/kg (0.01%) contained in the fluorescent lamps, about 99% are eliminated by the new process.

Although it results from the above in an unambiguous manner that the glass particles processed in this manner do not damage the environment, additional tests with respect to the strength of the binding and the ability of elution of the still remaining mercury in the glass particles were carried out.

The elution test according to DIN 38414, part 4 had the result that in a mixture sample consisting of equivalent parts of the samples GB 1-3 no mercury could be detected in the eluate, Since the detection limit of the used method is at 0.05 $\mu g/l$, this means that, with a drinking water limit of mercury of 1 g/l, the concentration in the eluate is less than 20 times this value.

The reason for this missing (or extremely low and being below the limit of detection) solubility resides in the binding form of the tiny particles of mercury sulphide still contained in the glass particles which results from the processing with the used liquid.

This means that the minimum total concentration in the glass particles is still supplemented by a very stable binding form which makes impossible washing out of the mercury in a deposit.

Accordingly, it can be summarized that at a comminution of discharge lamps gaseous and particular mercury is spontaneously converted within the described liquid into insoluble mercury compounds so that no gaseous emissions can result; and the residual concentration of the glass particles after a processing with this liquid (it is at about 1% of the starting concentration) is so low that damaging of the environment by means of the air, soil or water path can be excluded. The presence of the residual mercury in an immobile binding form (practically insoluble in water) enforces this statement.

Finally, it has to be mentioned that the containers used with the inventive process or the inventive means can be also formed as mobile devices. Furthermore, the invention covers all the possible embodiments of lamps, for example also round embodiments, embodiments in the shape of letters etc..

Figure 4:
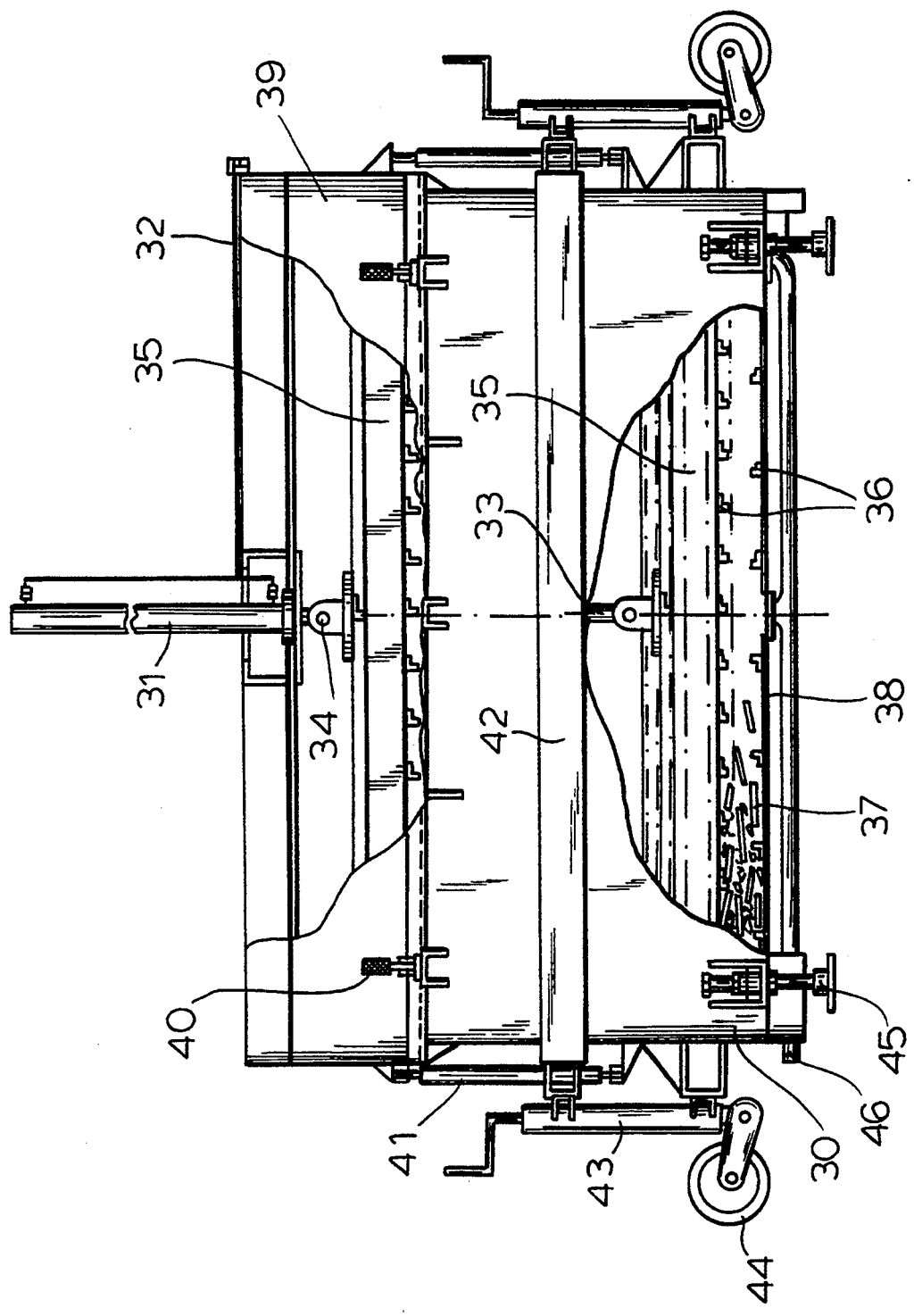
FIG. 4 is a front view, partly broken away, of a further embodiment of a container for the receipt of lamps which are to be disposed.

FIG. 4 shows another embodiment of a container of the inventive means. The container 30 has the shape of a rectangular box with a lid 39 and a bottom 38. The container is movable and has four wheels 44 at its front sides which can be moved upwardly and downwardly by means of manually actuated cranks. By the downward movement of the wheels 44 the container 30 obtains a transport position, while it has a stationary condition in FIG. 4 in which four stands 45 support the container on the ground. These stands are also movable up and down so that, dependent on the desired condition, the container can be either supported through the wheels 44 or through the stands 45.

The rectangular box has an encircling reinforcement band 42 which has appropriate mounts for posts 43 which rotatably support the wheels 44. Manually actuated cranks serve for adjusting the height of the wheels 44.

The lid 39 of the container is relatively high so that it can take up the plate 35 for destroying the lamps in its uppermost position. In this position the lid 39 can be swang away from the remaining container by means of suitable swing means. This process is assisted by two gas springs 41 which are provided at the front sides of the container. Closures 40 serve for closing the lid. These closures close the lid in a liquid-tight and gas-tight manner. Of course, suitable seals are provided between the lid and the container in order to guarantee the corresponding liquid-tight or gas-tight closure.

A double acting hydraulic cylinder 31 serves for the up and down movement of the plate 35. The piston of the hydraulic cylinder 31 is applied with pressure by means of a suitable hydraulic line 32. Control moans provide for the desired application of the piston on the upper or lower side thereof, if a downward movement or an upward movement of the plate 35 is desired. The piston is connected to a piston rod 33 which is mounted to the upper side of the plate 35 by means of a pivot connection 34. Tiltings etc. of the plate can be balanced by this pivot connection without transferring the corresponding loads to the piston rod.

In the container the pressure plate 35 is guided by means of four vertical rails disposed at the inner side of the container. The rails are in engagement with corresponding recesses in the plate by means of profile seals. These guide rails are not shown in FIG. 4. They provide for a correct up and down movement of the plate in a manner so that the same substantially maintains its horizontal position.

On the lower side of the plate 35 tooth ledges 36 extending transversely with regard to the longitudinal direction of the container are provided. Such tooth ledges are also provided at the bottom 38 of the container. These tooth ledges assist the crushing of the lamps which have to be disposed. In the embodiment of the FIGS. 1a, 1b, 2a, 2b, 3 the plate 35 is provided with a plurality of apertures so that the liquid can ascend upwardly through the apertures provided in the plate.

In the lower portion of one front side of the container a tube connection piece 46 is located which serves for emptying the container or for filling the container with the liquid.

Apart from the hood-like lid 39, the hydraulic drive of the plate 35, the gas springs 41, the wheels 44 and the stands 45 which are movable in their height the container of FIG. 4 corresponds in its construction and in its function substantially to the container shown in FIGS. 1 to 3 and described above.

Dependent on the respective embodiment, the hydraulic cylinder can be operated after throwing in one or more discharge lamps which have to be disposed of.

Figure 5:
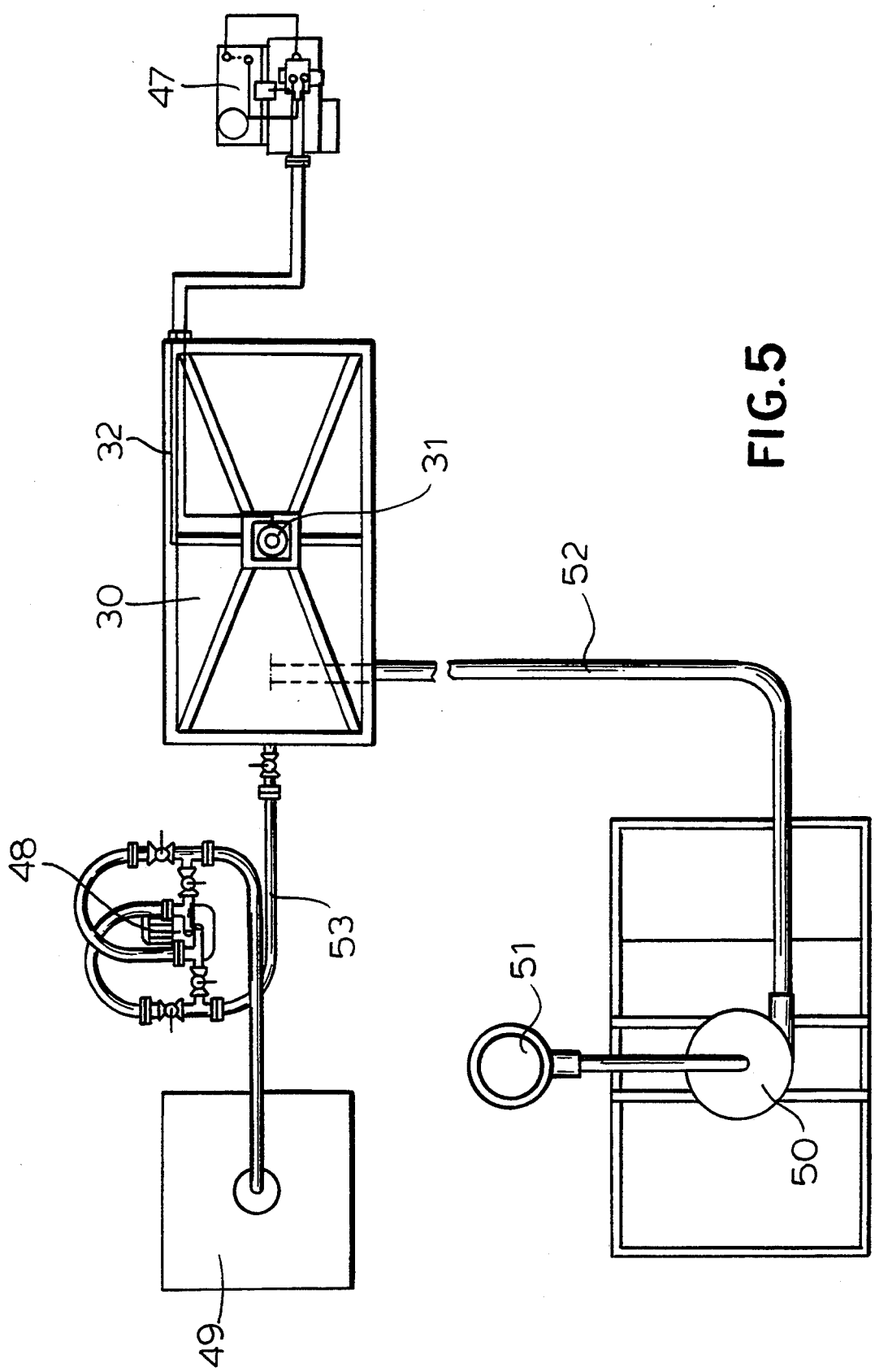
FIG. 5 is a flow diagram of the container together with further components of the inventive apparatus.

FIG. 5 shows a schematic view of the container 30 of FIG. 4 in connection with several accessory devices. On the one side the hydraulic cylinder 31 is connected to a hydraulic device 47 by means of hydraulic lines 32. The hydraulic device 47 is provided with appropriate control means. By the operation of the hydraulic device the piston rod 33 of the hydraulic cylinder 31 moves downwardly or upwardly in order to correspondingly move the plate 35 in the container up and down.

Furthermore, FIG. 5 shows that a liquid line 53 is connected to the discharge connection piece 46. The liquid line extends to a liquid container (intermediate container) 49 through an appropriate conveying punp 48. The liquid in the container 30 is pumped from the container through the line 53 into the intermediate container 49 and, optionally after corresponding processing, is repumped into the container.

The metal-glass-mixture generated in the container is sucked off into a silo 50 for further use by means of a line 52 and a vacuum generator 51.

As described and shown above, the plate disposed within the container can be a substantially plane member. However, the plate can also have a V-shaped or triangular cross-section, wherein it corresponds to a correspondingly formed bottom of the container. On account of the V-shaped bottom the introduced articles collect at the lowest position of the container, wherein a corresponding crush process takes place at the two triangle sides of the plate by lowering the same. By this embodiment it is ensured that the material which has to be crushed is concentrated in the middle of the bottom.

A further alternative with regard to the embodiment of the plate includes the feature that the plate is pivotally mounted at the container and is moved up and down by a swing process. For example, according to this embodiment the plate is mounted at a longitudinal side of the container by means of hinges. By swinging down the plate the articles are introduced into the liquid and finally crushed by further swinging down the plate. After termination of the crush process the plate is again swung upwardly.

Moreover, a stamp-like formed plate can be used.

According to a further embodiment of the invention an ultrasound processing means is provided in the container. With this means ultrasound pulses are applied to the liquid in the container. These ultrasound pulses very finely distribute the metal (mercury) which is released during the crushing of the articles and which has to be immobilized, whereby the immediate conversion of the metal into corresponding harmless compounds is promoted. For example, the ultrasound processing means can include a rod introduced into the container which sends the corresponding pulses. However, also parts of the container or the complete container can function as corresponding processing means if the same emit the corresponding pulses. Preferably, so-called immersible transducers are used which are disposed within the container.

With regard to the tube connection pieces for sucking in and sucking off it is advantageous to use a removable aperture plate with reinforcement which makes the sucking step faster and more effective. The bottom of the container is inclined, wherein the connection piece is disposed at the lowest point. The corresponding apertured plate is horizontally disposed and has a thickness of at least 3 mm. The apertures should not exceed 2.5 mm.

The above-mentioned ultrasound processing is particularly advantageous with special embodiments of lamps and advertisement illumination tubes since in this case mercury is present in a metallic form which is so large that the conversion takes place slowly. The emitted ultrasound waves comminute the metallic mercury with sufficient intensity such that a complete conversion occurs, for example into mercury sulphide.

The oscillations can be transferred by means of another basic container which is formed as ultrasound oscillation trough or by means of an especially intensive ultrasound rod.

As regards the central processing plant for the separation of the contents of the container, according to one variant a precipitation of the metal parts in settling containers in conical bottoms occurs prior to the filtration. Dependent on the loading of the liquid of the container with heavy metals from the articles which have to be disposed a value-dependent addition of iron chloride and flaking agent occurs.

Preferably water is used as liquid converting the metal or the metal vapor into harmless compounds which has added thereto compositions according to German patents 39 17 412 or 40 13 974, the disclosure of which is herewith incorporated by reference.

I claim:

1. A process for the waste disposal of articles containing a contaminant metal or metal vapor, comprising the steps of:
    (a) providing a container containing a bath of a liquid chemically reactive with said metal and said metal vapor to produce harmless compounds thereof;
    (b) pushing said articles into said bath of said liquid so that sufficient liquid of said bath is above said articles to prevent escape of said vapor;
    (c) crushing said articles within the bath to release said metal or said metal vapor from said articles and thereby reacting the liquid with said metal or said metal vapor to produce said compounds, so that the container contains said liquid, said compounds and residues of said articles as contents of said container;
    (d) emptying the contents of said container into a receptacle of a central processing plant;
    (e) separating at said central processing plant said contents of said receptacle into components including said liquid, said residues and a slurry of said compounds; and
    (f) separately discharging said components.

2. The process according to claim 1, wherein the articles are pushed into the liquid after the introduction of a plurality of articles into the container.

3. The process according to claim 1 wherein the articles are crushed within the liquid with the installation of a blocking thereabove so that substantially no components are thrown out of the liquid by implosions of said articles.

4. The process according to claim 1, further comprising the contents of the container to at least one rinsing step after having discharged the liquid.

5. The process according to claim 4 which comprises separating the slurry from the liquid discharged from the container and the rinsing agent, recovering liquid and rinsing agent by filtering from the residual slurry, recycling the same into the process and disposing the filtered slurry.

6. The process according to claim 4, which comprises separating the slurry by precipitation.

7. The process according to claim 4, which comprises separating plastics, glass and metal particles discharged from the container as said residues.

8. The process defined in claim 1 wherein said compounds are sulfides and said metal includes mercury.

9. The apparatus according to claim 8, further comprising a device for ultrasound processing disposed within the container.

10. An apparatus for the waste disposal of articles containing a contaminant metal or metal vapor, said apparatus comprising:
- a container containing a bath of a liquid chemically reactive with said metal and said metal vapor to produce harmless compounds thereof;
- means forming an inlet opening in said container enabling the introduction into said bath of said articles;
- pushing means in said container for pushing said articles into said bath so that sufficient liquid of said bath is above said articles to prevent escape of said vapor; and
- crushing means in said container for crushing said articles within the bath to release said metal or said metal vapor from said articles and thereby reacting the liquid with said metal or said vapor to produce said compounds, so that the container contains said liquid, said compounds and residues of said articles as contents of said container.

11. The apparatus according to claim 10, wherein the crushing means comprises two oppositely rotating crushing rollers forming between them a roller gap.

12. The apparatus according to claim 10, wherein the crushing means has a crushing roller which is adapted to be forwardly and backwardly moved within the container over the bottom of the same.

13. The apparatus according to claim 10, wherein the crushing means includes a plate movable up and down within the container for pushing the articles into the liquid and for crushing the same within the liquid.

14. The apparatus according to claim 8, wherein the plate (6) fills out nearly the entire inner surface of the container and is formed as apertured plate.

15. The apparatus according to claim 14, wherein the plate on its lower side and the container on the inner surface of its bottom wall have projecting portions.

16. The apparatus according to claim 14 wherein characterized in that the plate has a member blocking the inlet opening when the plate is in its lowered condition.

17. The apparatus according to claim 13, wherein characterized in that the plate is manually movable up and down.

18. The apparatus according to claim 13, wherein a central processing plant for the separation of the contents of the container.

19. The apparatus according to claim 18, wherein the central processing plant has a main processing receptacle and a settling container for the used liquid.

20. The apparatus according to claim 19, wherein the central processing plant has further settling containers for a rinsing agent and water.

21. The apparatus according to claim 19, wherein the main processing container receptacle has a separation means for glass or plastics and metal particles and for and the slurry.

22. The apparatus according to claim 21, further comprising screening means for the separation of the glass or plastics and metal particles.

23. The apparatus according to claim 14, wherein the plate is movable up and down in the container (30) is hydraulically or pneumatically movable.

24. The apparatus according to claim 23 wherein the container has a lid on which a hydraulic or pneumatic cylinder is disposed, with a piston rod connected to a upper side of the plate.

25. The apparatus according to claim 14, wherein the plate has at least one recess which is in sealed engagement with a guide rail disposed at an inner side of the container (30).

26. The apparatus according to claim 24, wherein the lid of the container is formed as a hood and is adapted to be swung off from the container together with the hydraulic or pneumatic cylinder and the plate.

27. The apparatus according to claim 1, wherein the container is movable.

28. The apparatus according to claim 1, wherein the container (30) has in a lower portion an aperture for discharging and filling the liquid.

29. The apparatus according to claim 24, wherein the lid is adapted to be opened under the assistance of at least one gas pressure spring.

30. The apparatus according to claim 14, wherein the plate is swingable up and down in the container.

31. The apparatus according to claim 14, wherein the plate is V-shaped and cooperates with a V-shaped bottom of the container.

* * * * *